US010040332B2

(12) United States Patent
Lawrence et al.

(10) Patent No.: US 10,040,332 B2
(45) Date of Patent: Aug. 7, 2018

(54) VEHICLE FAIRING FOR USE WITH AIR CONDITIONING UNIT

(71) Applicant: Thermo King Corporation, Minneapolis, MN (US)

(72) Inventors: Wilson Samuel Jesudason Lawrence, Karnataka (IN); Patil Raju, Karnataka (IN)

(73) Assignee: THERMO KING CORPORATION, Minneapolis, MN (US)

( * ) Notice: Subject to any disclaimer, the term of this patent is extended or adjusted under 35 U.S.C. 154(b) by 985 days.

(21) Appl. No.: 14/321,143

(22) Filed: Jul. 1, 2014

(65) Prior Publication Data
US 2014/0311705 A1    Oct. 23, 2014

Related U.S. Application Data

(63) Continuation of application No. 13/074,715, filed on Mar. 29, 2011, now Pat. No. 8,789,383.

(51) Int. Cl.
*B60H 1/26* (2006.01)
*B60H 1/00* (2006.01)

(52) U.S. Cl.
CPC ......... *B60H 1/00021* (2013.01); *B60H 1/262* (2013.01); *B60H 2001/00085* (2013.01)

(58) Field of Classification Search
CPC ........... B60H 1/245; B60H 1/26; B60H 1/262
See application file for complete search history.

(56) References Cited

U.S. PATENT DOCUMENTS

| 2,730,866 A | * | 1/1956 | Baker | B60H 1/00207 454/137 |
| 2,804,756 A | * | 9/1957 | Faulhaber | B60H 1/00207 454/137 |
| 3,738,621 A | | 6/1973 | Anderson | |

(Continued)

FOREIGN PATENT DOCUMENTS

| DE | 4339288 | 11/1993 |
| SU | 1088958 | 4/1984 |

OTHER PUBLICATIONS

Figures 1-3 of U.S. Appl. No. 13/074,715, filed Mar. 29, 2011, illustrate a bus roof fairing known to the inventors at the time of invention.

*Primary Examiner* — Ljiljana Ciric
*Assistant Examiner* — Alexis Cox
(74) *Attorney, Agent, or Firm* — Hamre, Schumann, Mueller & Larson, P.C.

(57) ABSTRACT

A vehicle including a vehicle body, an air conditioning unit, and a fairing. The vehicle body includes a roof having a front portion and a rear portion. The air conditioning unit is disposed within the vehicle body and includes a condenser configured to receive air from outside the vehicle body through an opening in the rear portion of the roof. The fairing is disposed over the rear portion of the roof and the opening thereby defining an interior volume between the fairing and the rear portion of the roof. The fairing includes a leading portion oriented toward the front portion of the roof. The leading portion has an air inlet such that when the vehicle moves in a forward direction air from outside the vehicle body enters the interior volume through the air inlet, passes through the opening, and passes through the condenser.

10 Claims, 5 Drawing Sheets

(56) References Cited

U.S. PATENT DOCUMENTS

| | | | |
|---|---|---|---|
| 4,217,764 A * | 8/1980 | Armbruster | B60H 1/3226 62/239 |
| 4,611,796 A | 9/1986 | Orr | |
| 4,748,825 A | 6/1988 | King | |
| 4,787,210 A | 11/1988 | Brown | |
| 5,560,219 A | 10/1996 | Vegara | |
| 5,588,301 A * | 12/1996 | Deroche, Sr. | B60H 1/3229 62/244 |
| 5,672,101 A * | 9/1997 | Thomas | B60H 1/00428 454/136 |
| 5,876,088 A | 3/1999 | Spears | |
| 6,357,249 B1 * | 3/2002 | Robinson | B60H 1/00364 62/244 |
| 6,443,253 B1 | 9/2002 | Whitehead et al. | |
| 6,915,651 B2 | 7/2005 | Hille et al. | |
| 6,983,619 B2 | 1/2006 | Hille et al. | |
| 7,140,959 B2 | 11/2006 | Haigh et al. | |
| 7,434,611 B2 | 10/2008 | Wunderlich et al. | |
| 8,966,921 B2 * | 3/2015 | Nazario | B60H 1/00471 165/204 |
| 2009/0313904 A1 | 12/2009 | Kerr et al. | |
| 2011/0061414 A1 * | 3/2011 | McAllister, II | B60H 1/00371 62/244 |
| 2017/0210195 A1 * | 7/2017 | Falagario | B60H 1/00378 |

* cited by examiner

US 10,040,332 B2

VEHICLE FAIRING FOR USE WITH AIR CONDITIONING UNIT

BACKGROUND OF THE INVENTION

The present invention relates to vehicle fairings. More specifically, the present invention relates to vehicle fairings for use with air conditioning units. Fairings help to improve the coefficient of drag for a vehicle and also can improve the aesthetic appeal of a vehicle.

SUMMARY OF THE INVENTION

The present invention provides, in one aspect, a vehicle including a vehicle body, an air conditioning unit, and a fairing. The vehicle body includes a roof having a front portion and a rear portion. The air conditioning unit is disposed within the vehicle body and includes a condenser configured to receive air from outside the vehicle body through an opening in the rear portion of the roof. The fairing is disposed over the rear portion of the roof and the opening thereby defining an interior volume between the fairing and the rear portion of the roof. The fairing includes a leading portion oriented toward the front portion of the roof. The leading portion has an air inlet such that when the vehicle moves in a forward direction air from outside the vehicle body enters the interior volume through the air inlet, passes through the opening, and passes through the condenser.

The present invention provides, in another aspect, a vehicle including a vehicle body, an air conditioning unit, and a fairing. The air conditioning unit is disposed within the vehicle body. The air conditioning unit includes a condenser configured to receive air from outside the vehicle body through an opening in the vehicle body. The fairing covers a portion of the vehicle body and the opening thereby defining an interior volume between the fairing and the portion of the vehicle body. The fairing includes a leading portion having an air inlet such that when the vehicle moves in a forward direction air from outside the vehicle body enters the interior volume through the air inlet, passes through the opening, and passes through the condenser.

The present invention provides, in another aspect, a fairing for a vehicle. The vehicle includes a vehicle body having a roof with a front portion and a rear portion and an air conditioning unit disposed within the vehicle body. The air conditioning unit includes a condenser configured to receive air from outside the vehicle body through an opening in the rear portion of the roof. The fairing includes a hollow body having a leading portion having an air inlet. The hollow body is configured to be disposed over the rear portion of the roof and the opening thereby defining an interior volume between the fairing and the rear portion of the roof and orienting the leading portion toward the front portion of the roof such that when the vehicle moves in a forward direction air from outside the vehicle body enters the interior volume through the air inlet, passes through the opening, and passes through the condenser Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
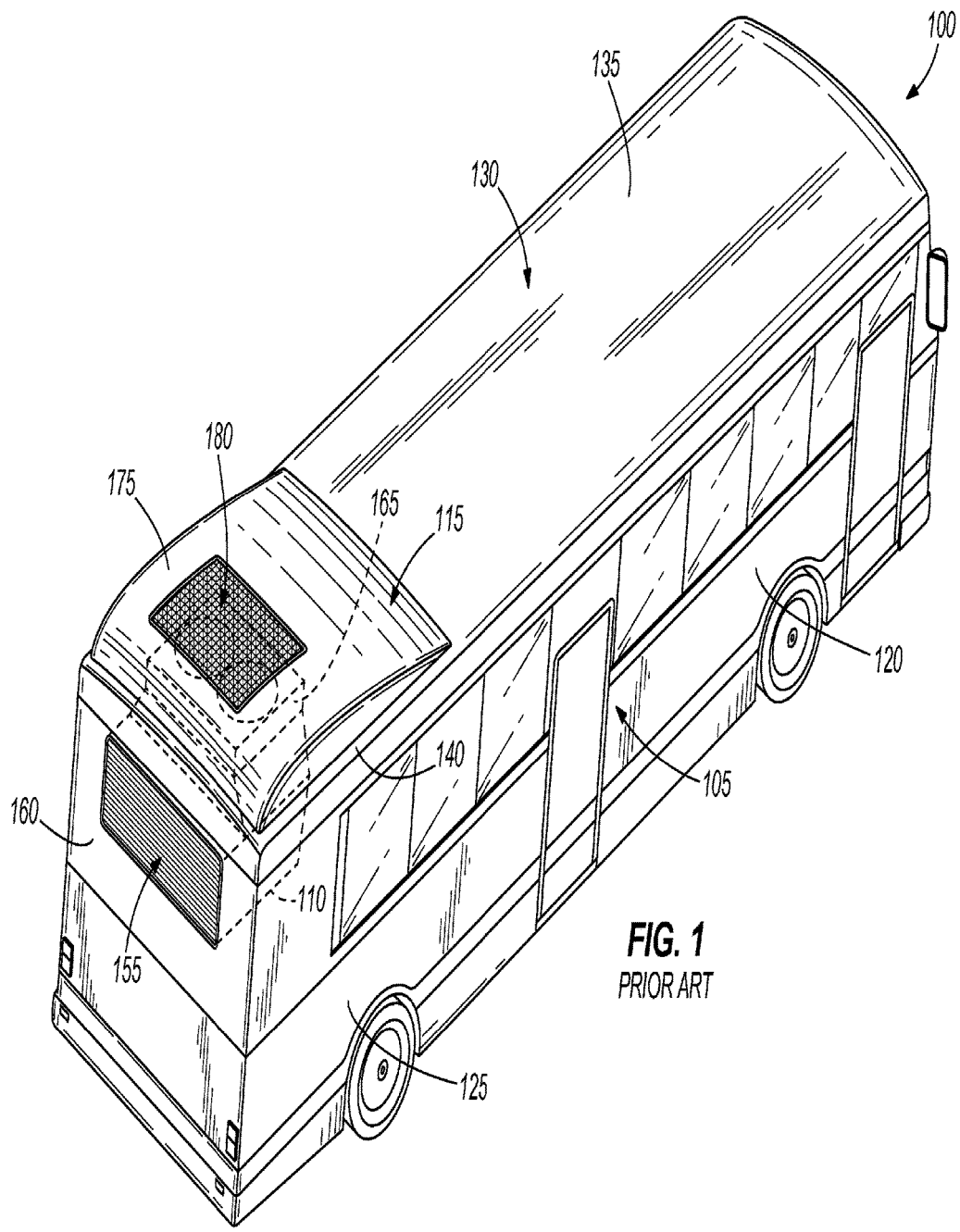
FIG. 1 is a perspective view of a vehicle including a known fairing.
Figure 2:
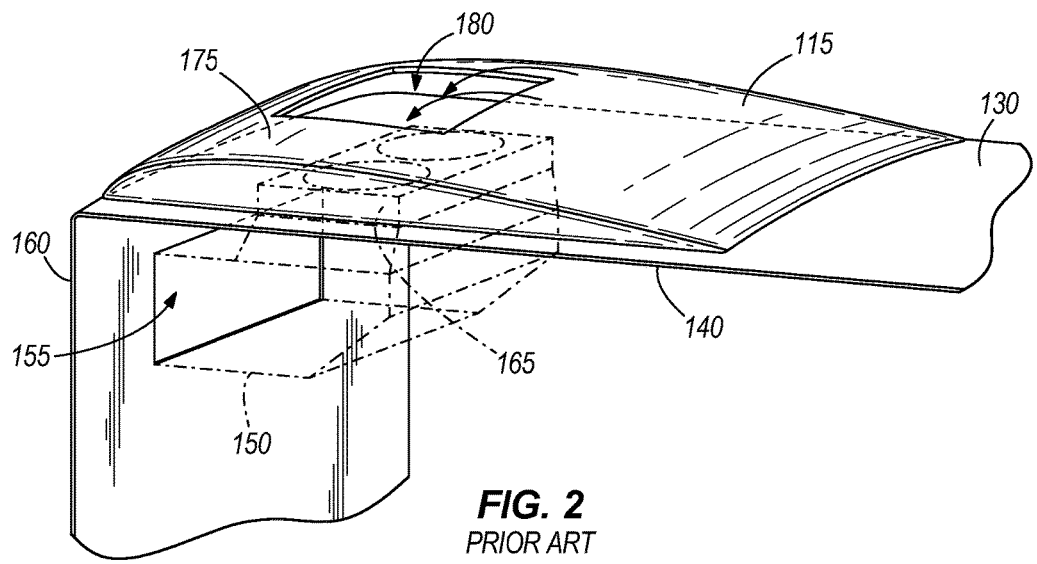
FIG. 2 is a perspective view of a portion of the vehicle of FIG. 1.
Figure 3:
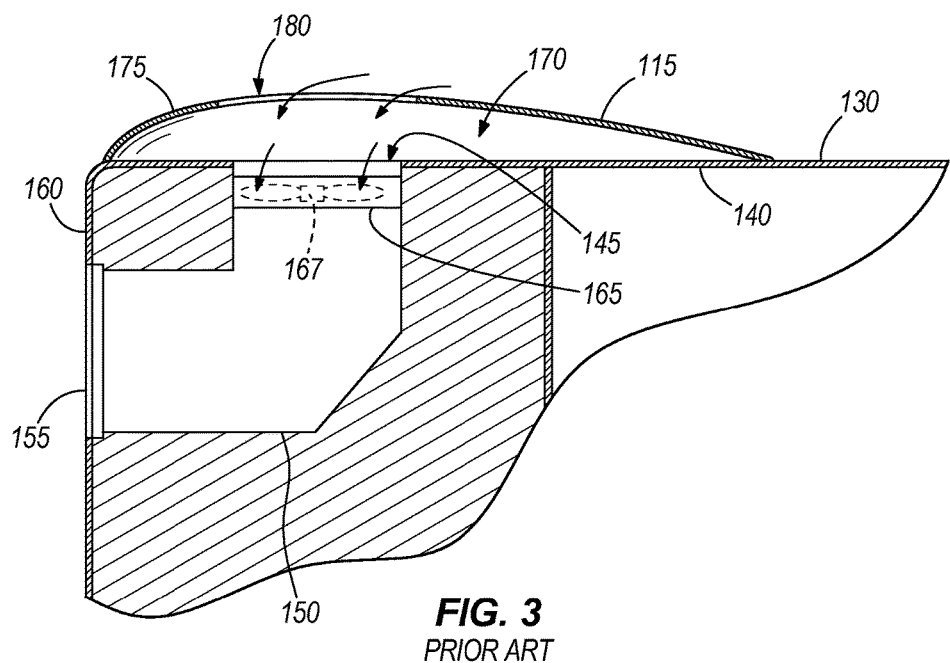
FIG. 3 is a sectional view of a portion of the vehicle of FIG. 1.

FIGS. 1-3 illustrate a vehicle 100 including a vehicle body 105, an air conditioning unit 110, and a known fairing 115. The vehicle 100 is a bus. The vehicle body 105 includes a front portion 120, a rear portion 125, and a roof 130. The roof 130 includes a front portion 135 and a rear portion 140. An opening or vehicle air inlet 145 is formed through the rear portion 140 to allow air to enter an air passage 150. The air passage 150 extends through the vehicle body 105 from the vehicle air inlet 145 to a vehicle air outlet 155 on a rear side 160 of the vehicle 100.

The air conditioning unit 110 is disposed within the rear portion 125 of the vehicle body 105. The air conditioning unit 110 is conventional and includes a compressor (not shown), a condenser 165, an expansion device (not shown), and an evaporator (not shown). At least a portion of the condenser 165 is positioned in the air passage 150 so that air passes through or across the condenser 165. In the illustrated embodiment, a condenser fan (167) is positioned in the air passage 150 and is operable to assist in drawing air through the condenser 165.

The fairing 115 is secured to the roof 130. The fairing 115 is disposed over the rear portion 140 of the roof 130 and over the vehicle air inlet 145. An interior volume 170 is defined between the fairing 115 and the roof 130. The fairing 115 includes a top portion 175. An air inlet 180 is formed in the top portion 175 so that air can enter the interior volume 170 through the air inlet 180. The air inlet 180 is positioned above the vehicle air inlet 145. The air inlet 180 is positioned at or near the peak or uppermost portion of the fairing 115.

In use, when the vehicle 100 travels in a forward direction, air from outside the vehicle body 105 enters the interior volume 170 through the air inlet 180 (as shown by the arrows in FIGS. 2-3). The air then enters the vehicle body 105 through the vehicle air inlet 145, passes through the air passage 150, through or across the condenser 165, and then exits the vehicle body 105 via the vehicle air outlet 155.

The air flow through the condenser 165 is important for controlling the refrigerant temperature and to prevent the condenser 165 from overheating. A high negative air pressure is created in the interior volume 170 of the fairing 115 as the vehicle 100 moves in the forward direction. Also, the air entering the fairing 115 circulates or swirls within the interior volume 170 to form a vortex that acts as a barrier to the air passage 150, thereby reducing the air flow to the condenser 165. Additionally, the condenser fan 167 delivers the air through the vehicle air outlet 155 to exit at the rear side 160 of the vehicle 100. When the vehicle 100 travels in the forward direction, the space behind the rear side 160 has a negative pressure and a large swirling air flow vortex that negatively affects the drag on the vehicle 100 and creates a barrier to the air exiting the vehicle body 105 through the vehicle air outlet 155.

Figure 4:
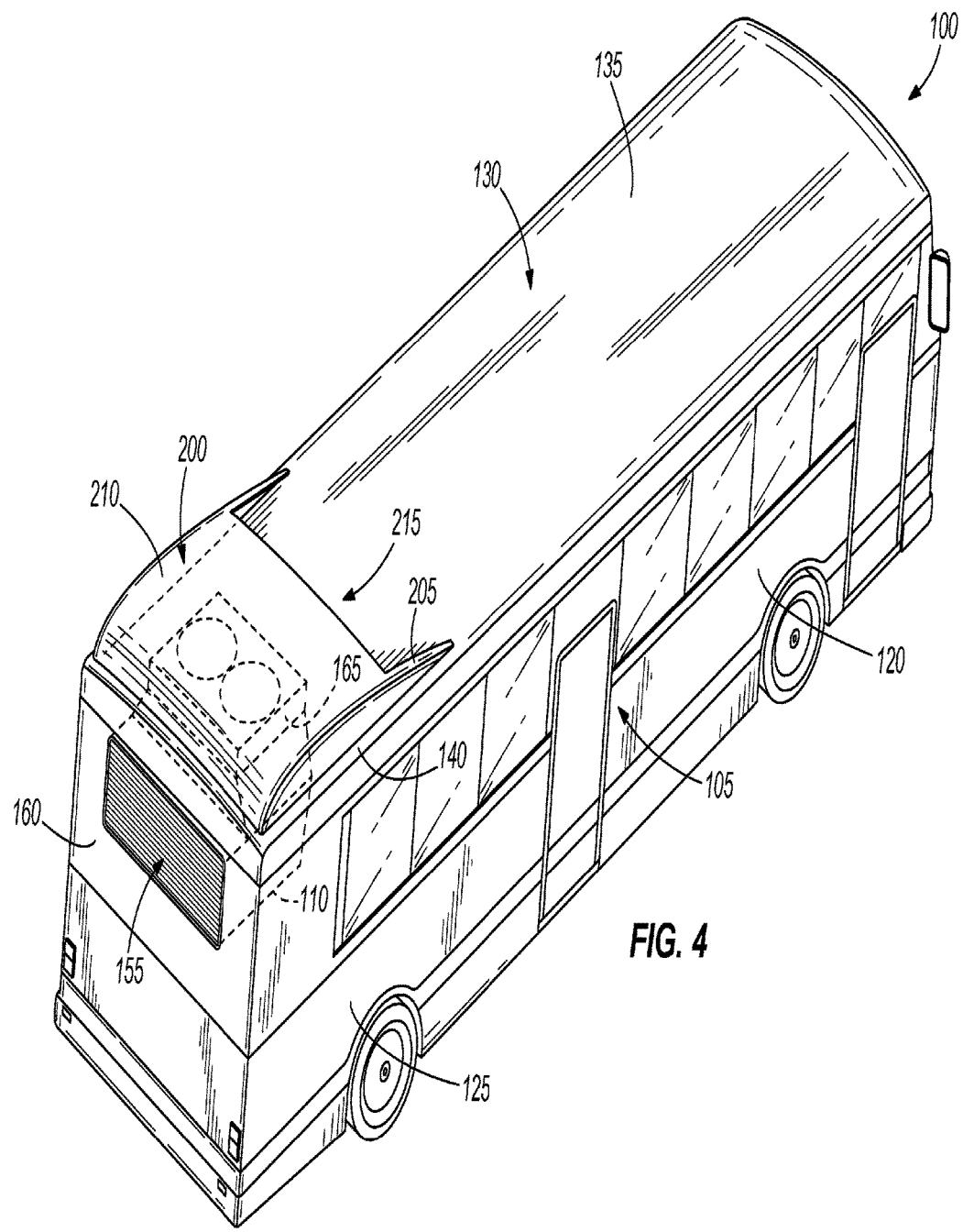
FIG. 4 is a perspective view of a vehicle according to one embodiment including a fairing.
Figure 5:
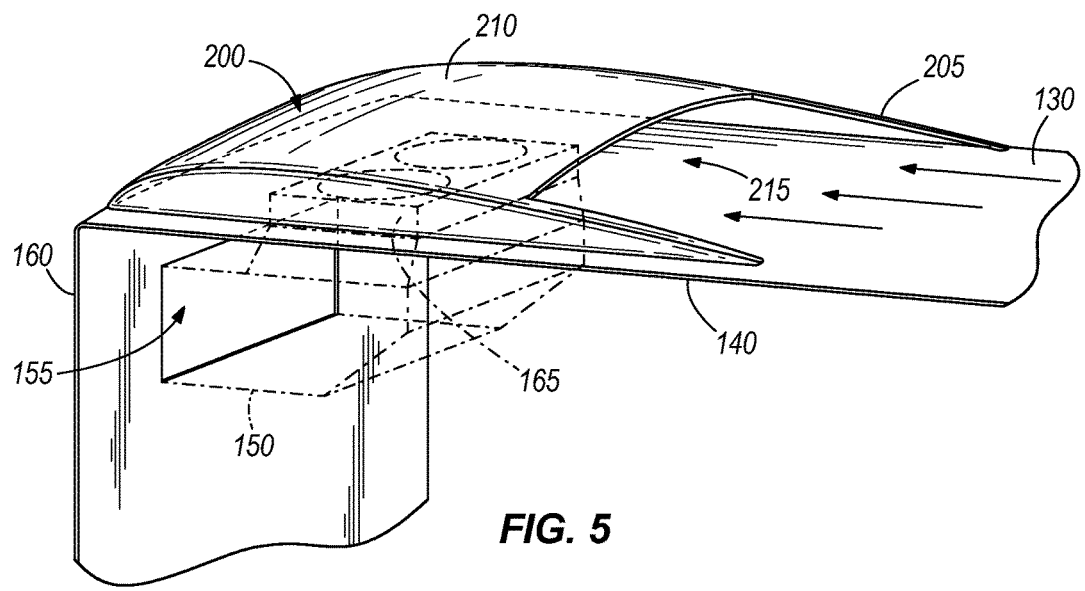
FIG. 5 is a perspective view of a portion of the vehicle of FIG. 4.
Figure 6:
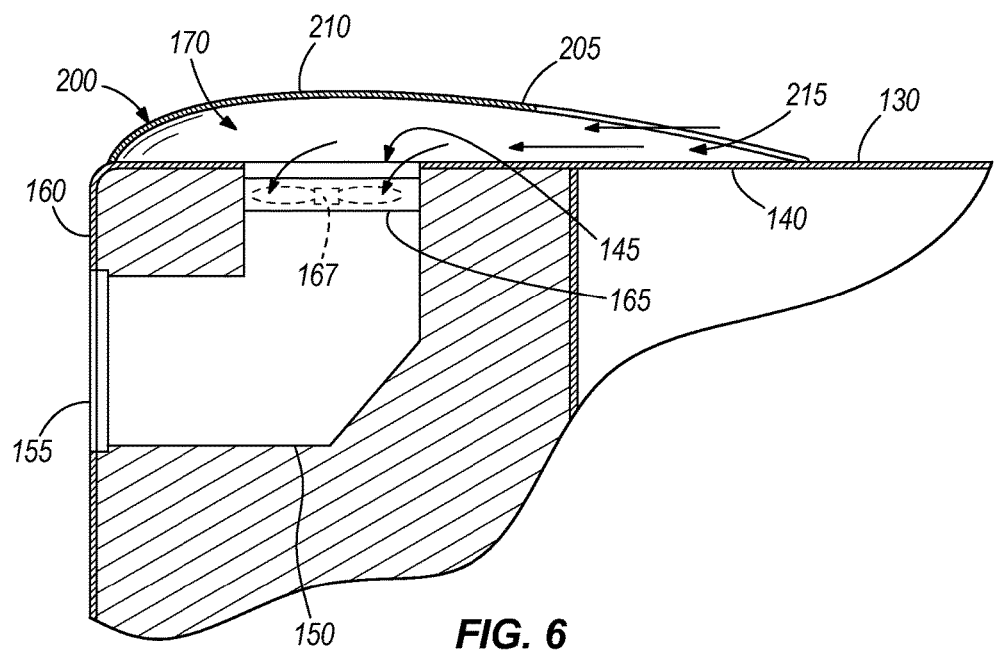
FIG. 6 is a sectional view of a portion of the vehicle of FIG. 4.

FIGS. 4-6 illustrate one embodiment of the invention including the vehicle 100 with a fairing 200. The fairing 200 is secured to the roof 130 and is a hollow body. Preferably, the fairing has an airfoil shape. The fairing 200 is disposed over the rear portion 140 of the roof 130 and over the vehicle air inlet 145. The interior volume 170 is defined between the fairing 200 and the roof 130. The fairing 200 includes a leading portion 205 and a top portion 210. The leading portion 205 is oriented towards the front portion 135 of the roof 130. The top portion 210 faces upward from the roof 130. An air inlet 215 is formed in the leading portion 205 so that air can enter the interior volume 170 through the air inlet 215. In the illustrated embodiment, the air inlet 215 is positioned entirely on the down-slope of the fairing 200. In the illustrated embodiment, the air inlet 215 is positioned to the front of the vehicle air inlet 145. In some embodiments, the air inlet 215 is positioned in the front third of the fairing 200. The size and shape of the air inlet 215 can vary. In the illustrated embodiment, the air inlet 215 is approximately 55 inches (139.7 centimeters) wide by 10 inches (25.4 centimeters) long with an area of approximately 550 square inches (3548.38 square centimeters).

In use, when the vehicle 100 travels in a forward direction, air from outside the vehicle body 105 enters the interior volume 170 through the air inlet 220 (as shown by the arrows in FIGS. 5-6). The air then enters the vehicle body 105 through the vehicle air inlet 145, passes through the air passage 150, through or across the condenser 165, and then exits the vehicle body 105 via the vehicle air outlet 155. The fairing 200 causes several different effects than the fairing 115. The swirling motion of the air in the interior volume 170 is reduced and a positive air pressure exists in the interior volume 170, both of which allow the air to enter the vehicle body 105 with less resistance. However, the drag on the vehicle 100 is increased relative to that illustrated in FIG. 1.

Figure 7:
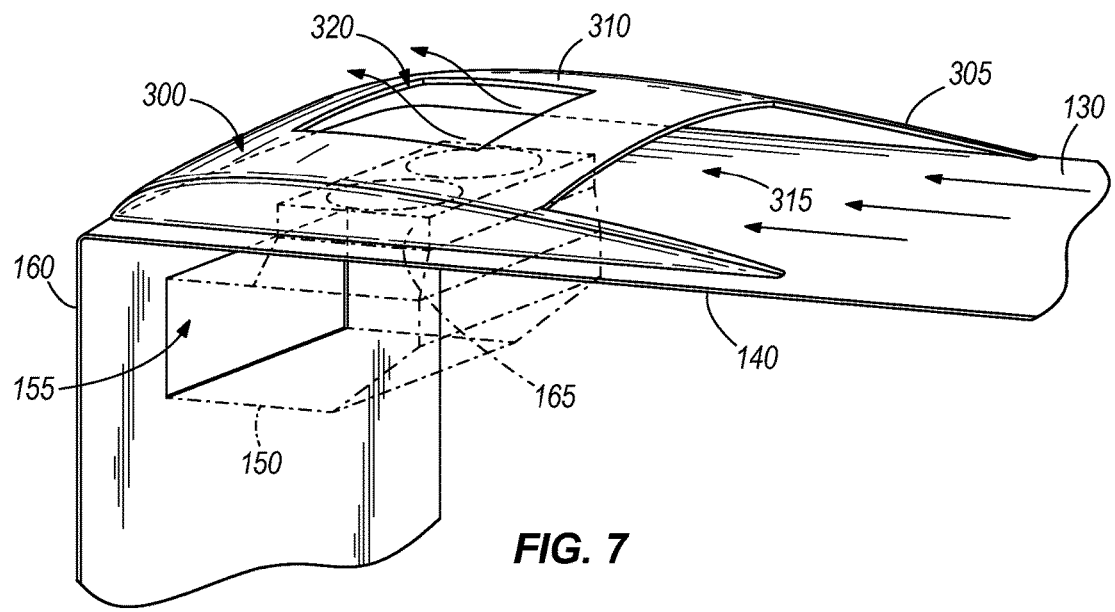
FIG. 7 is a perspective view of a portion of a vehicle according to another embodiment including a fairing.
Figure 8:
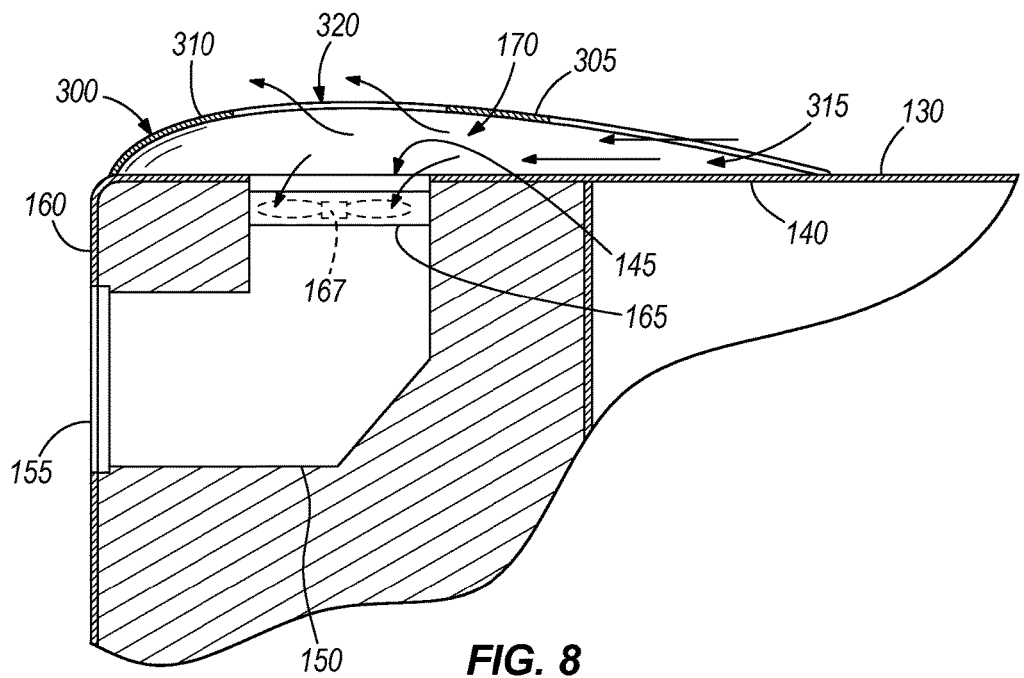
FIG. 8 is a sectional view of a portion of the vehicle of FIG. 7.

An alternative embodiment of the invention including a fairing 300 is illustrated in FIGS. 7-8. Components similar to those of the fairing 200 described above are numbered in a similar fashion plus one hundred. The fairing 300 includes an air outlet 320 formed in the top portion 310 so that air can exit the interior volume 170 through the air outlet 320. The air outlet 320 is positioned at or near the peak or uppermost portion of the fairing 300. The size and shape of the air outlet 320 can vary. Preferably, the area of the air outlet 320 is less than the area of the air inlet 315. In the illustrated embodiment, the air outlet 320 is positioned above the vehicle air inlet 145.

In use, when the vehicle 100 travels in a forward direction, air from outside the vehicle body 105 enters the interior volume 170 through the air inlet 315 (as shown by the arrows in FIGS. 7-8). A portion of the air enters the vehicle body 105 through the vehicle air inlet 145, passes through the air passage 150, through or across the condenser 165, and then exits the vehicle body 105 via the vehicle air outlet 155. Another portion of the air exits the interior volume 170 through the air outlet 320 (as shown by the arrows in FIGS. 7-8). The fairing 300 causes several different effects than the fairing 115 and the fairing 200. The swirling motion of the air in the interior volume 170 is reduced relative to the fairing 115 because the air has two exits from the interior volume 170: the vehicle air inlet 145 and the air outlet 320. The air pressure in the interior volume 170 is negative, but closer to zero, than with the fairing 115, which allows the air to enter the vehicle body 105 with less resistance. The airflow around the entirety of the vehicle 100 is changed so that the vortex in the space behind the rear side 160 of the vehicle 100 is lessened, which improves the drag on the vehicle 100 as compared the fairing 200.

Tests were conducted in which the vehicle 100 was accelerated to 45 miles/hour (72.42 kilometers/hour) with each of the three fairings 115, 200, and 300 to determine the effect each fairing has on the air flow rate through the condenser 165, the coefficient of drag for the vehicle 100, and the air pressure in the interior volume 170 at 45 miles/hour. At 45 miles/hour in the forward direction, the vehicle 100 with the fairing 115 has an air flow rate through the condenser 165 of 1831 cubic feet/minute (51.848 cubic meters/minute), a coefficient of drag of 1.64, and an air pressure in the interior volume 170 of −205 Pa (−0.0297 pounds/square inch). At 45 miles/hour in the forward direction, the vehicle 100 with the fairing 200 has an air flow rate through the condenser 165 of 4852 cubic feet/minute (137.393 cubic meters/minute), a coefficient of drag of 1.70, and an air pressure in the interior volume 170 of 36 Pa (0.00522 pounds/square inch). At 45 miles/hour in the forward direction, the vehicle 100 with the fairing 300 has an air flow rate through the condenser 165 of 4295 cubic feet/minute (121.620 cubic meters/minute), a coefficient of drag of 1.64, and an air pressure in the interior volume 170 of −53 Pa (−0.00769 pounds/square inch). Both the fairing 200 and the fairing 300 provide an improved air flow rate when compared to the fairing 115. The fairing 300 provides an improved air flow rate with the same coefficient of drag as the fairing 115.

Various features of the invention are set forth in the following claims.

What is claimed is:

1. A fairing for a vehicle including a vehicle body having a roof, the vehicle including an air conditioning unit disposed within the vehicle body, the air conditioning unit including a condenser configured to receive air from outside the vehicle body through an opening of the roof, the fairing comprising:

a top portion including a front edge, a rear edge opposing the front edge, and two opposing side edges, wherein the top portion has a curved arc shape extending from the front edge to the rear edge, a leading portion including a first portion and a second portion, the first portion extending from one of the two opposing side edges of the top portion past the front edge of the top portion, and the second portion extending from the other of the two opposing side edges of the top portion past the front edge of the top portion, wherein the first portion, the second portion, and the front edge define an air inlet configured to allow air to pass into an interior volume under the top portion, the air inlet is located along a front portion of the fairing, and wherein the fairing is configured to be disposed over the opening in the roof of the vehicle body to direct at least a portion of the air passing into the interior volume into the opening in the roof of the vehicle body when the fairing is disposed over the roof of the vehicle body.

2. The fairing of claim 1, wherein the fairing is configured to be disposed over a rear portion of the roof such that the interior volume is located between the fairing and the rear portion of the roof, each of the first portion and the second portion extends from a respective one of the two opposing side edges of the top portion towards a front portion of the roof, and when the vehicle moves in a forward direction air from outside the vehicle body enters the interior volume through the air inlet, passes through the opening in the roof, and passes through the condenser.

3. The fairing of claim 1, wherein the top portion includes an air outlet such that when the vehicle moves in a forward direction air from outside the vehicle body enters the interior volume through the air inlet and a portion of the air exits the fairing through the air outlet.

4. The fairing of claim 1, wherein
the area of the air inlet is greater than the area of an air outlet, and
the air inlet is a single opening defined by the front edge, the first portion and the second portion.

5. The fairing of claim 1, wherein the curved arc shape includes a front up-slope portion starting from the front edge, the front up-slope portion extending upwardly as it extends from the front edge in a direction towards the rear edge.

6. The fairing of claim 1, wherein the curved arc shape includes a rear up-slope portion starting from the rear edge, the rear up-slope portion extending upwardly as it extends from the rear edge in a direction towards the front edge.

7. The fairing of claim 5, wherein the air inlet is positioned entirely on the front up-slope portion.

8. The fairing of claim 3, wherein
the curved arc shape includes:
a front up-slope portion starting from the front edge, the front up-slope portion extending upwardly as it extends from the front edge in a direction towards the rear edge, and
a rear up-slope portion starting from the rear edge, the rear up-slope portion extending upwardly as it extends from the rear edge in a direction towards the rear edge, and
the air outlet is positioned on the front up-slope portion and the rear up-slope portion.

9. The fairing of claim 1, wherein the first portion and the second portion are separated by the air inlet.

10. The fairing of claim 1, wherein the fairing has a front leading edge, the front leading edge comprising an edge of the first portion, an edge of the second portion, and the front edge of the top portion.

* * * * *